United States Patent
Sobhana

(10) Patent No.: US 11,802,479 B2
(45) Date of Patent: Oct. 31, 2023

(54) NOISE REDUCTION FOR DOWNHOLE TELEMETRY

(71) Applicant: Halliburton Energy Services, Inc., Houston, TX (US)

(72) Inventor: Rashobh Rajan Sobhana, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/584,645

(22) Filed: Jan. 26, 2022

(65) Prior Publication Data

US 2023/0258076 A1 Aug. 17, 2023

(51) Int. Cl.
*E21B 47/20* (2012.01)
*G01V 3/18* (2006.01)

(52) U.S. Cl.
CPC ............... *E21B 47/20* (2020.05); *G01V 3/18* (2013.01)

(58) Field of Classification Search
CPC .......... E21B 47/12; E21B 47/14; E21B 47/18; E21B 47/20; E21B 47/22; E21B 47/24;
(Continued)

(56) References Cited

U.S. PATENT DOCUMENTS 7,577,528 B2   8/2009  Li et al.
8,350,715 B2 * 1/2013  Shearer ............... H04L 25/4902
                                                   340/853.3
(Continued)

FOREIGN PATENT DOCUMENTS

GB   2452675 A   3/2009
GB   2457175 A   8/2009
(Continued)

OTHER PUBLICATIONS

Specification and Drawings for International Application No. PCT/US2022/14482, entitled "Noise Reduction for Downhole Telemetry," filed Jan. 31, 2022, 36 pages.
(Continued)

*Primary Examiner* — Franklin D Balseca
(74) *Attorney, Agent, or Firm* — Conley Rose, P.C.; Rodney B. Carroll

(57) ABSTRACT

A telemetry system includes a downhole device configured to generate modulated pressure pulses in drilling fluid within a drill string, first and second transducers configured provide first and second telemetry signals, respectively, responsive to pressure variations in the drilling fluid, and a telemetry computer coupled to the transducers. The telemetry computer includes a processor and a memory coupled to the processor. The memory contains instructions that, when executed by the processor, cause the telemetry computer to be configured to transform the first and second telemetry signals to a time-frequency domain representation to provide first and second time-frequency telemetry signals, respectively; and apply an unmixing filter to the first and second time-frequency telemetry signals to provide an enhanced signal in the time-frequency domain. The enhanced signal has a source signal component separated from a noise component, and the first and second telemetry signals are mixed source-noise signals.

18 Claims, 4 Drawing Sheets

(58) Field of Classification Search
CPC ... G01V 3/18; G10L 21/0232; G10L 21/0208; G10L 25/30; H04R 1/1083; G06F 11/002
See application file for complete search history.

(56) References Cited

U.S. PATENT DOCUMENTS

| | | |
|---|---|---|
| 8,811,118 B2 | 8/2014 | Reckmann |
| 9,928,848 B2 * | 3/2018 | Cahill ................... G10L 21/028 |
| 11,049,509 B2 * | 6/2021 | Mukund ............... G10L 21/028 |
| 11,393,443 B2 * | 7/2022 | Kim ........................ G10L 25/18 |
| 11,600,281 B2 * | 3/2023 | Vasilache ............ G10L 21/0224 |
| 2002/0180613 A1 | 12/2002 | Shi et al. |
| 2017/0328199 A1 | 11/2017 | Marsh |
| 2021/0032984 A1 * | 2/2021 | Kabannik ............... G01V 1/364 |

FOREIGN PATENT DOCUMENTS

| | | |
|---|---|---|
| WO | 2008036793 A3 | 3/2009 |
| WO | 2016093819 A1 | 6/2016 |
| WO | 2016108912 A1 | 7/2016 |

OTHER PUBLICATIONS

Mwachaka, Saleh M. et al., "A Review of Mud Pulse Telemetry Signal Impairments Modeling and Suppression Methods," Journal of Petroleum Exploration and Production Technology, 2019, vol. 9, pp. 779-792, CrossMark.

* cited by examiner

NOISE REDUCTION FOR DOWNHOLE TELEMETRY

TECHNICAL FIELD

This present disclosure relates generally to downhole telemetry systems. In particular, embodiments herein are related to separating a source signal component from a received telemetry signal to reduce the impact of pump noise, thus increasing the signal to noise ratio (SNR) in mud pulse telemetry communications.

BACKGROUND

Hydrocarbon drilling and production operations utilize a large quantity of information relating to parameters and conditions downhole. Such information can include characteristics of the earth formations traversed by the borehole, along with data relating to the size and configuration of the borehole itself. The collection of information relating to conditions downhole is generally referred to as "logging."

In some cases, drillers log the borehole during the drilling process, which reduces or eliminates the necessity of removing or "tripping" the drilling assembly to insert a wireline logging tool to collect such logging data. Data collection during drilling also enables the driller to make accurate modifications or corrections as needed to steer the well or improve drilling performance while reducing down time.

Designs for measuring conditions downhole including the movement and location of the drilling assembly contemporaneously with the drilling of the well are commonly known as "measurement-while-drilling" techniques, or "MWD." Similar techniques, concentrating more on the measurement of formation parameters, are commonly known as "logging-while-drilling"techniques, or "LWD." While distinctions between MWD and LWD may exist, the terms MWD and LWD often are used interchangeably. In this disclosure, the term LWD will be used with the understanding that this term encompasses both the collection of formation parameters and the collection of information relating to the movement and position of the drilling assembly.

In LWD systems, sensors in the drill string measure the desired drilling parameters and/or formation characteristics. While drilling is in progress these sensors continuously or intermittently transmit the information to a surface detector by some form of telemetry. Most LWD systems use the drilling fluid (or "mud") in the drill string as the information carrier, and are thus referred to as mud pulse telemetry systems.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
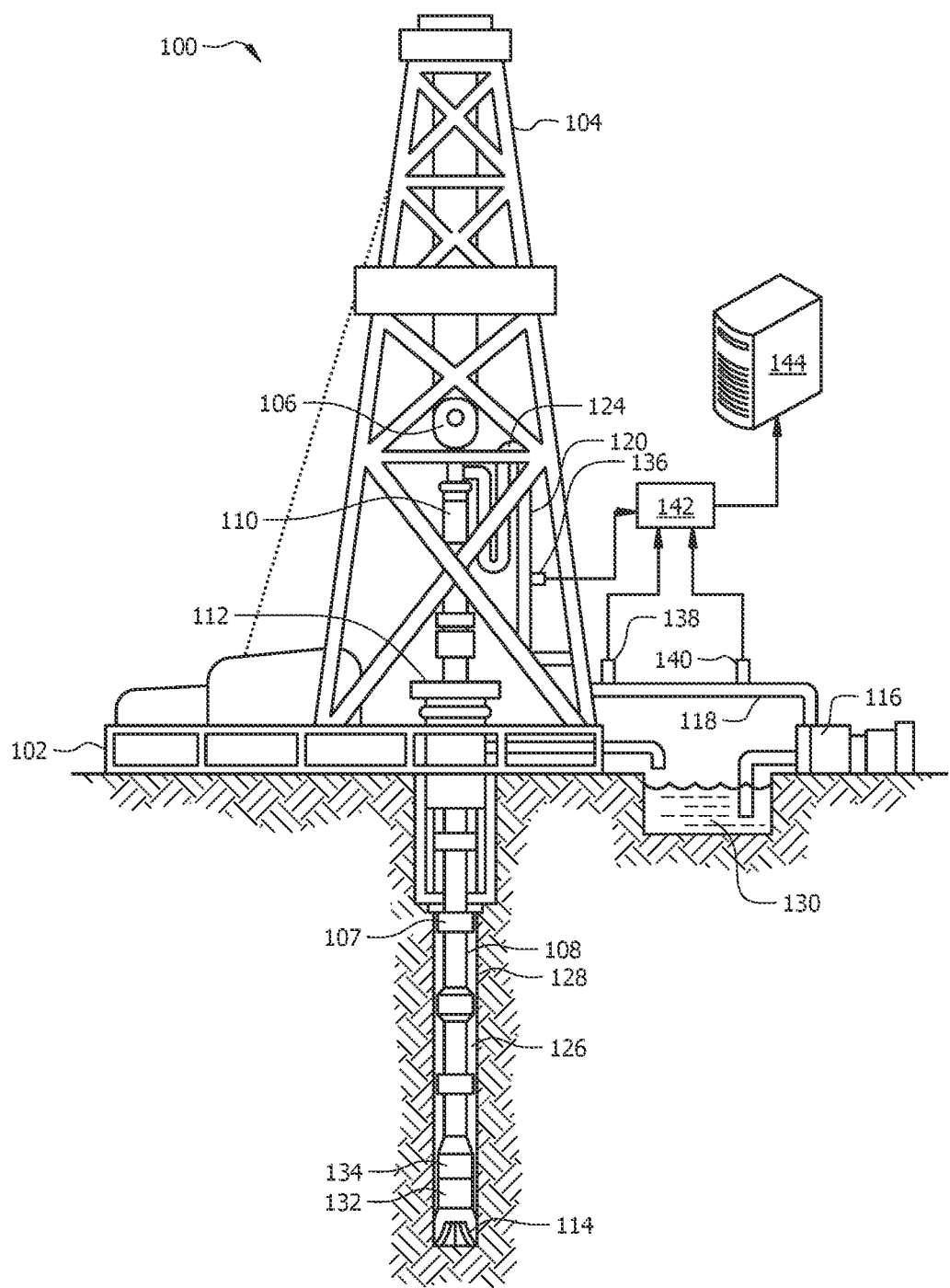
FIG. 1 is a diagram illustrating an exemplary environment for using a telemetry computer according to the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Illustrative embodiments and related methodologies of the present disclosure are described below as they might be employed in a downhole telemetry system that separates a source signal component from a received telemetry signal to reduce the impact of pump noise, thus increasing the signal to noise ratio (SNR) in mud pulse telemetry communications. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

In some cases, mud pulse telemetry systems can use a downhole "pulser" located near the drill bit to transmit a series of modulated pressure waves through the mud column within a drill string to communicate real-time information to one or more transducers/sensors located proximate to the surface (e.g., near or on the drilling rig). However, pumps that pump the mud through the drill string generate noise, which adversely affects the quality of mud pulse telemetry source signals (e.g., the signals generated by the downhole pulser to communicate information to the surface), such as by reducing a signal-to-noise ratio (SNR) in a received signal that is received by the sensor(s) at the surface. For simplicity, the downhole pulser is also referred to herein as a transmitter, or mud pulse telemetry transmitter, and the surface transducers/sensors are also referred to herein as receivers, or mud pulse telemetry receivers. The downhole pulser generates modulated pressure pulses in the drilling fluid, which encodes information in the pressure pulses.

The pump noise is characterized by one or more fundamental frequencies and their harmonics. In examples in which the pump(s) are located relatively closer to the telemetry receivers, the pump noise amplitude may be larger than the received source signal amplitude, which makes pulse detection challenging. Accordingly, in order to retrieve information from the mud pulse telemetry source signal, it is useful to mitigate this pump noise.

Examples of this description address the foregoing by transforming telemetry signals from transducers (e.g., located proximate to the surface), which are represented in the time domain, to a time-frequency domain representation. As described, the transducers provide the telemetry signals responsive to pressure variations in drilling fluid within a drill string. The telemetry signals in both the time domain and time-frequency domain are mixed signals that include a source signal component and a noise component. The source signal component of the time-frequency telemetry signals is separated or isolated by applying an unmixing filter (also referred to as an unmixing matrix) to the first and second time-frequency telemetry signals. In one example, the unmixing filter is applied in a blind source separation algorithm to provide an enhanced signal in the time-frequency domain. The enhanced signal contains a source component separated from a noise component, unlike the time-domain and time-frequency telemetry signals, which are mixed signals. Accordingly, the separated source component of the enhanced signal can then be transformed back to the time domain, and processed further (e.g., by the telemetry computer 144) without the presence and/or interference of the noise component.

In some examples, the unmixing filter is determined during a first time period in which a downhole device (e.g., the downhole pulser or mud pulse telemetry transmitter) does not generate modulated pressure pulses. Because the downhole device does not generate modulated pressure pulses, the pressure pulses received by transducers (e.g., first and second transducers) correspond to the noise in the downhole environment. Accordingly, the first and second transducers are configured to provide first and second noise signals, respectively, responsive to the pressure variations in the drilling fluid detected during the first time period. The first and second noise signals are transformed from the time domain to a time-frequency domain representation. Also, a synthetic telemetry signal (e.g., a test signal, which may be represented by a data file stored in a computer memory) is transformed to a time-frequency domain representation. In another example, the synthetic telemetry signal may be stored as a time-frequency domain representation, thus obviating the need to specifically transform the synthetic telemetry signal to its time-frequency domain representation. The time-frequency domain noise signals are mixed with (e.g., added to) the time-frequency domain synthetic telemetry signal to provide a mixed signal. The filter values of the unmixing filter are then estimated by providing the mixed signal to a neural network, which is also aware of the synthetic telemetry signal content (e.g., prior to mixing with the noise signals). The neural network is thus trained and provides an unmixing filter or matrix of filter values that are useful (e.g., by the blind source separation algorithm) to provide a source component separated from a noise component.

The following description relates to a variety of mud pulse telemetry methods and systems that enable MWD or LWD services with real-time data transfer from sensors or survey tools in a bottomhole assembly (BHA) to a surface location. While the mud pulse telemetry processing concepts described herein focus on surface components, it should be appreciated that such mud pulse telemetry processing may applied to or implemented by downhole systems as well.

The telemetry computer described herein can be employed in an exemplary wellbore operating environment 100 shown, for example, in FIG. 1. FIG. 1 illustrates a schematic view of a wellbore operating environment 100 in accordance with some examples of the present disclosure, such as during drilling operations. The wellbore operating environment 100 includes a drilling platform 102 that is equipped with a derrick 104 that supports a hoist 106.

Drilling of hydrocarbon wells is carried out by a string of drill pipes connected together by "tool" joints 107 so as to form a drill string 108. The hoist 106 suspends a top drive 110 that is used to rotate the drill string 108 and to lower the drill string through the wellhead 112. A drill bit 114 is connected to the lower end of the drill string 108. The drill bit 114 is rotated and drilling accomplished, such as by rotating the drill string 108, by use of a downhole motor near the drill bit 114, or by both rotating the drill string 108 and use of a downhole motor. A mud pump 116 pumps drilling fluid through a flow line 118, a stand pipe 120, a goose neck 124, the top drive 110, and down through the drill string 108 at relatively high pressures and volumes to emerge through nozzles or jets in the drill bit 114. The drilling fluid then travels back up the borehole via the annulus 126 formed between the exterior of the drill string 108 and the borehole wall 128, through a blowout preventer (not specifically shown in FIG. 1 for simplicity), and into a mud pit 130 at the surface. On the surface, the drilling fluid is cleaned and then circulated again by mud pump 116. The drilling fluid is used to cool the drill bit 114, to carry cuttings from the base of the bore to the surface, and to balance the hydrostatic pressure in the rock formations. Various materials can be used for drilling fluid, including oil-based fluids and water-based fluids.

In wells employing mud pulse telemetry for logging while drilling ("LWD"), downhole tools 132 collect data regarding the formation properties and/or various drilling parameters. The downhole tools 132 are coupled to a telemetry module 134 that transmits the data to the surface. Telemetry module 134 modulates a resistance to drilling fluid flow to generate pressure pulses that propagate at the speed of sound to the surface. Various transducers, such as transducers 136, 138 and 140, convert the pressure signal into electrical signals for a signal digitizer 142 (e.g., an analog to digital converter (ADC)). While three transducers 136, 138, 140 are illustrated, a greater number of transducers, or fewer transducers, may be used in particular situations (discussed more thoroughly below).

The digitizer 142 supplies a digital form of the pressure signals to a telemetry computer 144 or some other form of a data processing device. Telemetry computer 144 operates in accordance with software (which may be stored on a non-transitory, computer-readable storage medium) to process and decode the received signals. The resulting telemetry data may be further analyzed and processed by telemetry computer 144 to generate a display of useful information. For example, a driller could employ telemetry computer 144 to obtain and monitor bottom hole assembly (BHA) position and orientation information, drilling parameters, and formation properties. In another example, the resulting telemetry data may be further analyzed and processed by telemetry computer 144 to implement an automated control response of the drilling system shown in FIG. 1. For example, the automated control response may include altering one or more drilling parameters (e.g., weight on bit 114, rotation speed of the bit 114, direction of the bit 114) responsive to measured downhole parameters indicated by the telemetry data. The telemetry computer 144 is described in further detail below, as it pertains to the examples of the present disclosure.

Telemetry module 134 generates a traveling pressure signal representative of measured downhole parameters. In an ideal system, each and every pressure pulse created downhole would propagate upstream and be easily detected by a transducer at the surface. However, drilling fluid pressure fluctuates significantly and contains noise from several sources (e.g., bit noise, torque noise, and mud pump noise). Bit noise is created by vibration of the drill bit 114 during the drilling operation. As the bit 114 moves and vibrates, the drilling fluid exit ports in the bit 114 can be partially or momentarily restricted, creating a high frequency noise in the pressure signal. Torque noise is generated downhole by the action of the drill bit 114 sticking in a formation, causing the drill string 108 to torque up. The subsequent release of the drill bit 114 relieves the torque on the drill string 108 and generates a low frequency, high amplitude pressure surge. Finally, the mud pump 116 creates cyclic noise as the pistons within the pump 116 force the drilling fluid into the drill string 108.

It should be noted that while FIG. 1 generally depicts a land-based operation, the principles described herein are equally applicable to operations that employ floating or sea-based platforms and rigs, without departing from the scope of the disclosure. Also, even though FIG. 1 depicts a vertical wellbore, the present disclosure is equally well-suited for use in wellbores having other orientations, including horizontal wellbores, slanted wellbores, multilateral wellbores or the like.

In some approaches, attempts to mitigate pump 116 noise include acquiring one or more signals indicative of the pump 116 noise, which are then used to reduce or remove the pump 116 noise from the received signals. For example, signals indicative of pump 116 noise may be provided by a microphone positioned proximate to the mud pump 116, a vibration sensor positioned proximate to the mud pump 116, a stroke monitor of the mud pump 116, or the like. The signals indicative of pump 116 noise can then be "subtracted" from a received telemetry signal to reduce the impact of noise on the transmitted source signal. However, regardless of the particular type of signal indicative of the pump 116 noise, this signal is generated in addition to the received telemetry signal. Accordingly, these approaches introduce increased signal processing complexity, as well as system connectivity complexity, because the telemetry computer 144 processes both the received telemetry signal (and thus is coupled to the transducers 136, 138, 140) as well as the signal indicative of pump 116 noise (and thus is coupled to the sensor or device that generates the signal indicative of pump 116 noise). Such connectivity and coordination between sensors and devices at a real-world rig site can be difficult to implement.

Figure 2:
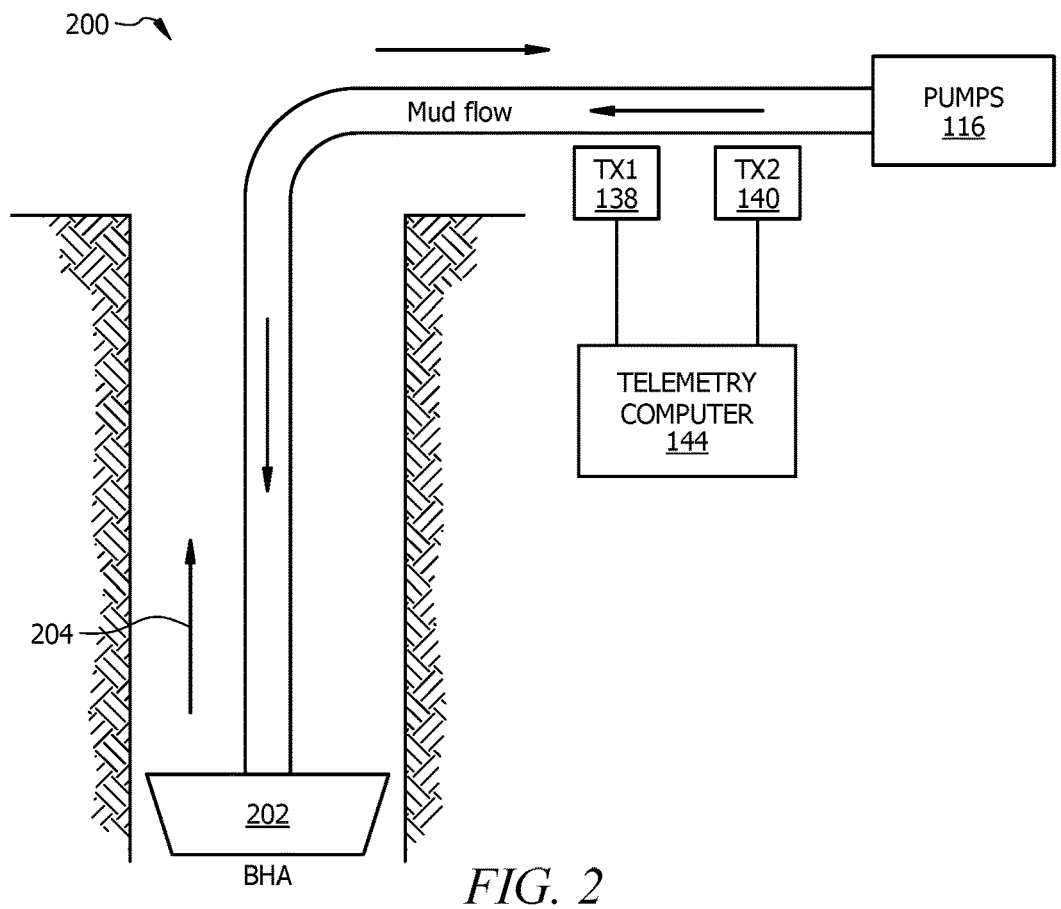
FIG. 2 is a simplified diagram illustrating a mud pulse telemetry system, according to the present disclosure.

FIG. 2 is a simplified schematic diagram of a mud pulse telemetry system 200 in accordance with examples of the present disclosure. The mud pulse telemetry system 200 includes a BHA 202, which can include the downhole tool(s) 132 and/or the telemetry module 134 described above. The downhole tool(s) 132 may include one or more sensors that are configured to measure downhole parameters including, but not limited to, environmental parameters, directional drilling parameters, and formation evaluation parameters. Example parameters may comprise downhole pressure, downhole temperature, the resistivity or conductivity of the drilling mud and earth formations, the density and porosity of the earth formations, as well as position and/or orientation information. As explained, the circulating column of drilling mud flowing through the drill string 108 may function as a medium for transmitting pressure signals 204 carrying information from the downhole tool(s) 132 to the surface. For example, the BHA 202 may include a pulser or mud pulse telemetry transmitter that is configured to generate the pressure signals 204 used for mud pulse telemetry. The BHA 202, or the telemetry module 134 of the BHA 202, is configured to transmit information to the surface by modulating the pressure signals 204. Different modulation techniques are possible, such as pulse position modulation (PPM), differential pulse position modulation (DPPM), and pulse width modulation (PWM), among others.

In the example of FIG. 2, the mud pulse telemetry system 200 also includes transducers 138, 140 that are configured to receive the pressure signals 204 and to convert the pressure signals 204 into electrical signals. The mud pulse telemetry system 200 includes the telemetry computer 144, which is configured to receive such electrical signals from the transducers 138, 140 (e.g., by way of digitizer 142, not shown in FIG. 2 for simplicity). The telemetry computer 144 is configured to retrieve information from the electrical signals, which represent the modulated pressure signals 204, by applying a demodulation technique to the electrical signals. The particular demodulation technique may be selected based on the modulation technique used by the BHA 202 or the telemetry module 134 to encode the modulated pressure signals 204.

In an ideal system, the pressure signals 204 created downhole would propagate upstream and be easily detected by a transducer at the surface. However, drilling fluid pressure fluctuates significantly and contains noise from several sources (e.g., bit noise, torque noise, and mud pump noise) as described above. Accordingly, the pressure signals 204 include both a source signal component (e.g., corresponding to the signal generated by the telemetry module 134) and a noise component (e.g., corresponding to noise from one or more noise source(s)).

Examples of this description address the foregoing by transforming frames of telemetry signals from first and second transducers 138, 140, which are represented in the time domain, to a time-frequency domain representation. Because data is available, and thus acquired from the transducers 138, 140 in an ongoing (e.g., continuous) manner, time-frequency domain analysis is useful to consider both frequency domain components of the available data, as well as their relation to the time domain. Accordingly, in at least some examples, real time analysis is thus enabled by the embodiments described herein.

Similar to the pressure signals 204, both the time-domain and time-frequency telemetry signals are mixed signals that include a source signal component and a noise component. The source signal component of the time-frequency telemetry signals is separated or isolated by applying an unmixing filter (also referred to as an unmixing matrix) to the first and second time-frequency telemetry signals. In one example, the unmixing filter is applied in a blind source separation algorithm to provide an enhanced signal in the time-frequency domain. The enhanced signal contains a source component separated from a noise component, unlike the time domain and time-frequency telemetry signals, which are mixed signals. The separated source signal component of the enhanced signal represents or corresponds to the modulated pressure pulses generated by the downhole device. Accordingly, the separated source component of the enhanced signal can then be transformed back to the time domain, and processed further (e.g., by the telemetry computer 144) without the presence and/or interference of the noise component.

Figure 3:
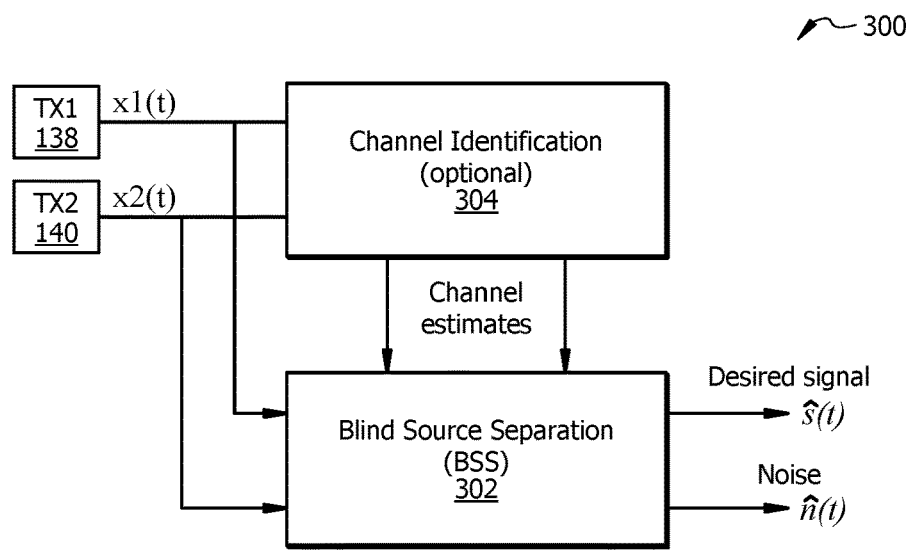
FIG. 3 is block diagram illustrating an example application of a blind source separation algorithm to separate a source signal component from received telemetry signals from first and second transducers, according to the present disclosure.

FIG. 3 is block diagram of a system 300 illustrating an example application of a blind source separation algorithm to separate a source signal component from frames of received telemetry signals from first and second transducers, according to the present disclosure. The system 300 includes a blind source separation (BSS) engine 302, and optionally a channel identification engine 304. The engines 302, 304 may include executable instructions stored on a memory (e.g., of the telemetry computer 144) that, when executed by a processor, cause the processor or associated computing device to provide various functionality as described herein. In examples that include the channel identification engine 304, the channel identification engine 304 is configured to estimate a transfer function or impulse response of transmission channels between a noise source (e.g., pump 116) and the transducers. For example, the channel identification engine 304 is configured to estimate a first transfer function or impulse response of a first transmission channel between the pump 116 and the first transducer 138. The channel identification engine 304 is also configured to estimate a second transfer function or impulse response of a second transmission channel between the pump 116 and the second transducer 140. The first and second transfer functions are useful to the BSS engine 302, such as to determine an initial unmixing matrix, which can be used to initialize the neural network that provides a final unmixing matrix, as described above.

The BSS engine 302 is configured to receive signals x1(t) and x2(t), which are time-domain telemetry signals provided by the first and second transducers 138, 140, respectively. In some examples, the signals x1(t) and x2(t) are provided to a signal conditioning block (not shown in FIG. 3 for simplicity) to remove a direct current (DC) bias component and/or band-limit the signals to a particular frequency band. Irrespective of whether the signals x1(t) and x2(t) are so conditioned, the signals x1(t) and x2(t) provided by the transducers 138, 140 can be represented as:

$$\begin{bmatrix} x1 \\ x2 \end{bmatrix} = \begin{bmatrix} h1s & h1n \\ h2s & h2n \end{bmatrix} * \begin{bmatrix} s \\ n \end{bmatrix}, \quad (1)$$

In Equation 1, * is the time-domain convolution operator, s is a source signal component (e.g., corresponding to the signal generated by the telemetry module 134), n is a noise component (e.g., corresponding to noise from one or more noise source(s), such as pump 116), h1s is the channel impulse response between the telemetry module 134 and the first transducer 138, h2s is the channel impulse response between the telemetry module 134 and the second transducer 140, h1n is the channel impulse response between the noise source (e.g., pump 116) and the first transducer 138, and h2n is the channel impulse response between the noise source and the second transducer 140.

The BSS engine 302 is configured to transform the received time-domain telemetry signals x1(t) and x2(t) to a time-frequency domain representation. For example, the time-domain convolution in Equation 1 can be transformed to multiplication in the time-frequency domain, such as given by Equation 2:

$$\begin{bmatrix} X1(k, t) \\ X2(k, t) \end{bmatrix} = \begin{bmatrix} H1s(k, t) & H1n(k, t) \\ H2s(k, t) & H2n(k, t) \end{bmatrix} \begin{bmatrix} S(k, t) \\ N(k, t) \end{bmatrix}, \quad (2)$$

In one example, H1s(k, t), H2s(k, t), H1n(k, t), H2n(k, t), X1(k, t), X2(k, t), S(k, t), and N(k, t) are the short-time Fourier transforms (STFT) of h1s, h2s, h1n, h2n, x1, x2, s, and n, respectively. Accordingly, in this example, the BSS engine 302 performs STFTs to transform various signals (e.g., x1(t) and x2(t)) to the time-frequency domain. In these examples, k and t are indices for frequency bins and time bins, respectively. Equation 2 can be rewritten as:

$$X(k, t) = H(k, t)S(k, t), \text{ where} \quad (3)$$

$$X(k, t) = \begin{bmatrix} X1(k, t) \\ X2(k, t) \end{bmatrix},$$

$$H(k, t) = \begin{bmatrix} H1s(k, t) & H1n(k, t) \\ H2s(k, t) & H2n(k, t) \end{bmatrix}, \text{ and}$$

$$S(k, t) = \begin{bmatrix} S(k, t) \\ N(k, t) \end{bmatrix}.$$

In Equation 3, H(k, t) can be referred to as a mixing matrix. Accordingly, from Equation 3, S(k, t) can be estimated if the inverse of the mixing matrix is available. The inverse of the mixing matrix can be referred to as an unmixing matrix. For example, $\hat{S}(k, t) = G(k, t)X(k, t)$, where $\hat{S}(k, t)$ is an estimate of S(k, t), from which the time-domain estimate $\hat{s}(t)$ can be obtained, and where G(k, t) is the inverse/unmixing matrix. However, in practice, both the mixing matrix and the unmixing matrix are unknown. The determination or estimation of the mixing and unmixing matrices is described further below, such as with reference to FIG. 5.

The BSS engine 302 is configured to separate or isolate a source signal component of the time-frequency telemetry signals by applying the unmixing filter or matrix to the time-frequency telemetry signals. That is, the BSS engine 302 is configured to compute $\hat{S}(k, t) = G(k, t)X(k, t)$, where $\hat{S}(k, t)$ is an enhanced signal in the time-frequency domain that includes the source signal component S(k, t) separated from the noise component N(k, t). By contrast, both the time-domain telemetry signals x1(t) and x2(t) and the time-frequency telemetry signals X1(k, t) and X2(k, t) are mixed signals that include both the source signal component (e.g., corresponding to the signal generated by the telemetry module 134), and noise component (e.g., corresponding to noise from one or more noise source(s), such as pump 116). Accordingly, the BSS engine 302 is also configured to transform the separated source signal component (e.g., $\hat{S}(k, t)$) of the enhanced signal (e.g., $\hat{S}(k, t)$) back to the time domain as $\hat{s}(t)$. In some examples, the BSS engine 302 is also configured to transform the separated noise signal component (e.g., $\hat{N}(k, t)$) of the enhanced signal back to the time domain as $\hat{n}(t)$. The $\hat{s}(t)$ output of the BSS engine 302 is thus an estimate of the signal generated by the downhole device by modulating pressure pulses, while the $\hat{n}(t)$ output of the BSS engine 302 is thus an estimate of the noise present in the drilling mud environment, such as due to the pump 116. The telemetry computer 144 can then further process the separated source signal component in the time domain without the presence and/or interference of the noise component.

Figure 4:
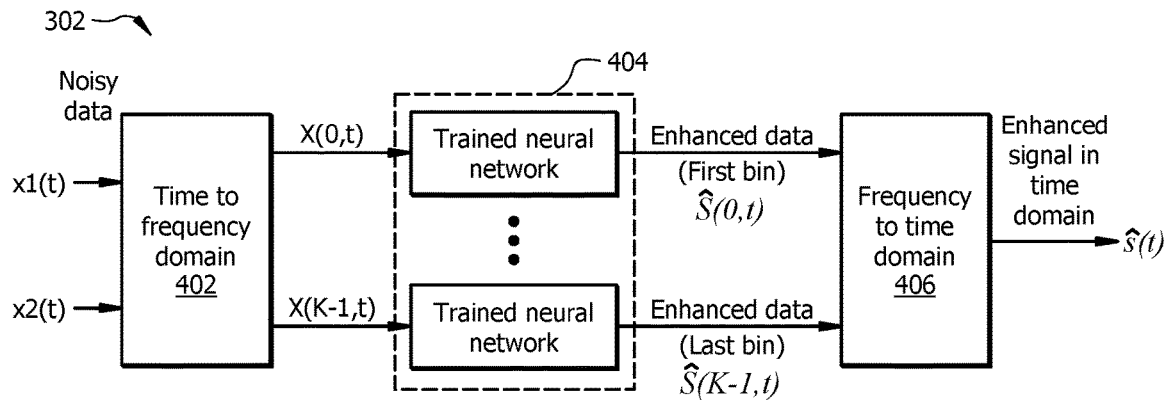
FIG. 4 is a functional block diagram of the blind source separation algorithm implemented by a telemetry computer, according to embodiments of the present disclosure.

FIG. 4 is a functional block diagram of the BSS engine 302, which may be implemented by a telemetry computer 144, according to embodiments of the present disclosure. At block 402, the BSS engine 302 is configured to transform the time-domain signals x1(t) and x2(t) provided by the transducers 138, 140 to a time-frequency domain representation.

Accordingly, the output(s) of the time to frequency domain block 402 are X(0, t) through X(K-1, t), where K is the total number of frequency bins, and each X(k, t) includes X1(k, t) and X2(k, t), corresponding to the first and second time domain telemetry signals, respectively.

At block 404, the BSS engine 302 is configured to use a trained neural network to apply the unmixing filter or matrix to the time-frequency telemetry signals X(0, t) through X(K-1, t). The trained neural network block 404 applies a corresponding unmixing matrix G(k, t) to each of the time-frequency telemetry signals X(0, t) through X(K-1, t). The unmixing matrix G(k, t) includes K frequency-domain filters, with each of the frequency-domain filters corresponding to one of the K frequency bin components of the time-frequency telemetry signals. The application of the unmixing matrix to the time-frequency telemetry signals provides an enhanced signal in the time-frequency domain, which includes a source signal component separated from a noise component. For example, a first unmixing matrix G(0, t) is applied to (e.g., multiplied with) the first time-frequency telemetry signal X(0, t) to provide $\hat{S}$(0, t), while an Kth unmixing matrix G(K-1, t) is applied to (e.g., multiplied with) the Kth time-frequency telemetry signal X(K-1, t) to provide $\hat{S}$(K-1, t). Accordingly, the output(s) of the trained neural network block 404 are $\hat{S}$(0, t) through $\hat{S}$(K-1, t). In the example of FIG. 4, the noise component is not useful and can be discarded, and thus is not shown as an output of the trained neural network block 404. However, in other examples, the trained neural network block 404 can be similarly configured to provide the noise components of the enhanced signal, such as $\hat{N}$(0, t) through $\hat{N}$(K-1, t).

At block 406, the BSS engine 302 is configured to transform the enhanced signal, or the separated source signal component of the enhanced signal, back to a time domain representation, shown as $\hat{s}$(t), such as by applying an inverse FFT (IFFT) to the separated source signal component. For example, the frequency to time domain block 406 receives the separated source signal components for the K frequency bins (e.g., $\hat{S}$(0, t) through $\hat{S}$(K-1, t)) from the trained neural network block 404. The frequency to time domain block 406 then performs an appropriate transform on the frequency bin components of the enhanced signal, or the separated source signal component of the enhanced signal, to provide the time domain representation of the same (e.g., $\hat{s}$(t)). As described above, $\hat{s}$(t) is an estimation of the signal generated by the downhole device (e.g., the telemetry module 134) by modulating pressure pulses. Accordingly, the telemetry computer 144 can then further process the separated source signal component in the time domain without the presence and/or interference of the noise component.

Figure 5:
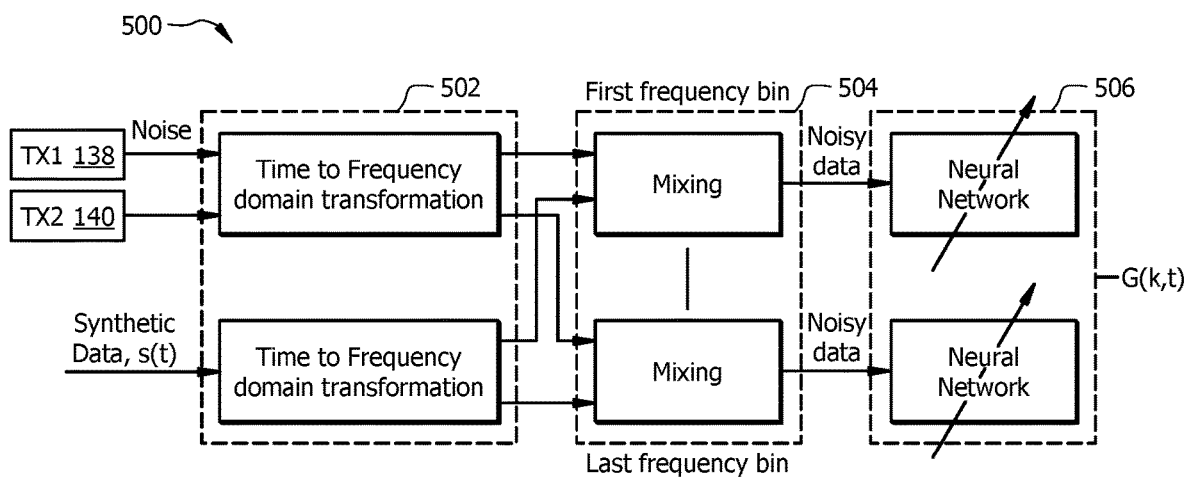
FIG. 5 is a functional block diagram of a training algorithm to determine unmixing filters for the blind source separation algorithm using a synthetic source signal, according to embodiments of the present disclosure.

As described above, in practice, both the mixing matrix and the unmixing matrix are unknown. FIG. 5 is a functional block diagram of a training algorithm 500 to determine unmixing filters for the blind source separation algorithm using a synthetic source signal, according to embodiments of the present disclosure. The training algorithm 500 may be implemented by the telemetry computer 144. The training algorithm 500 is applied during a first time period in which a downhole device (e.g., the downhole pulser or mud pulse telemetry transmitter) does not generate modulated pressure pulses. Because the downhole device does not generate modulated pressure pulses, the pressure pulses received by transducers (e.g., first and second transducers 138, 140) correspond to the noise in the downhole environment. Accordingly, the first and second transducers 138, 140 are configured to provide first and second noise signals, respectively, responsive to the pressure variations in the drilling fluid detected during the first time period.

At block 502, the first and second noise signal frames are transformed from the time domain to a time-frequency domain representation. Also, at block 502, a synthetic telemetry signal frame (e.g., a frame of a test signal, which may be represented by a data file stored in a computer memory) is transformed to a time-frequency domain representation. In another example, the synthetic telemetry signal frame(s) may be stored as a time-frequency domain representation, thus obviating the need to specifically transform the synthetic telemetry signal frame to its time-frequency domain representation. In an example, the synthetic telemetry signal, of which the synthetic telemetry signal frame is a part, is an arbitrary signal that is generated (e.g., at the surface) rather than acquired. The synthetic telemetry is useful to be mixed with noise-only acquired data, which resultant mixed signal data is then used to train a neural network to determine an unmixing matrix.

In the example of FIG. 5, block 504 mixes (e.g., adds) the time-frequency noise signals with the time-frequency synthetic telemetry signal to provide a mixed signal in the time-frequency domain. For example, the time to frequency block 502 produces time-frequency noise signals in each of multiple frequency bins, and also produces time-frequency synthetic telemetry signals in each of those multiple frequency bins. For each frequency bin, the mixing block 504 mixes (e.g., adds) the corresponding frequency bin component of the noise signal with the corresponding frequency bin component of the synthetic telemetry signal, to provide the mixed signal. The mixed signal is synthetically-generated noisy data, in which the noise component is known (e.g., as the output of the transducers 138, 140 during the first time period) and the telemetry signal is known (e.g., due to being synthetically generated).

In the example of FIG. 5, block 506 receives the synthetically-generated noisy data from block 504. The neural network block 506 is also aware of the synthetic telemetry signal content, as well as the noise component. Accordingly, the neural network block 506 is generally aware of, or provided with, the S(k, t) and X(k, t) terms in the alternative representation of Equation 3, S(k, t)=G(k, t)X(k, t).

The neural network block 506 is configured to estimate the filter values of the unmixing filter G(k, t), such as by comparing an initial output (e.g., responsive to an initial unmixing filter) to the known S(k, t) for a given X(k, t). The neural network block 506 is further configured to adjust weights of the unmixing filter (e.g., filter values for each unmixing filter for each of the various frequency bins), such as to reduce or minimize the error/difference between the computed output using the updated, estimated unmixing filter and the expected output (e.g., based on the known synthetic telemetry signal content and the noise component). After a certain number of iterations, or reaching an acceptable error/difference value, the neural network block 506 is configured to provide an unmixing filter or matrix of filter values (e.g., G(k, t)), which are useful (e.g., by the BSS engine 302, described above) to provide a source component separated from a noise component. The training algorithm 500 can also be applied during subsequent time periods in which the downhole device does not generate modulated pressure pulses (e.g., noise-only time periods), which allows the unmixing matrix or unmixing filter G(k, t) to be updated over time.

Figure 6:
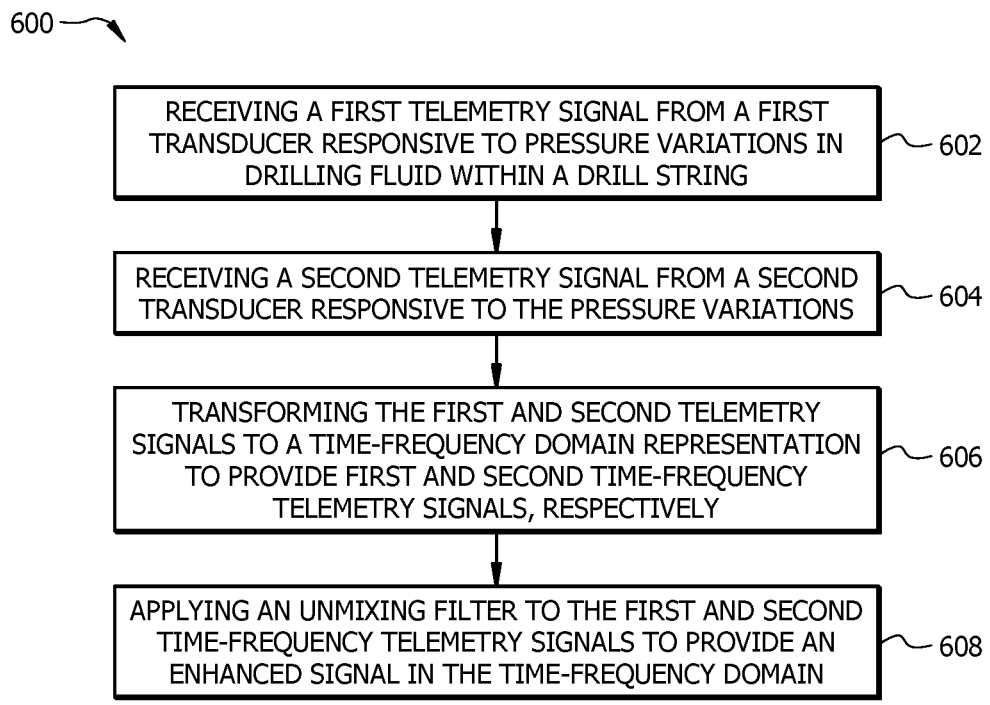
FIG. 6 is a flow chart of a method for separating a source signal component from a received telemetry signal to reduce the impact of pump noise, according to embodiments of the present disclosure.

FIG. 6 is a flow chart of a method 600 in accordance with examples described herein. In some examples, at least some of the operations of the method 600, as well as other operations described herein, can be implemented as instructions stored in a computer-readable medium and executed by one or more processors (along with acquisition system components such as transducers, interconnects, and the like) of the telemetry computer 144. The method 600 begins in block 602 with receiving a first telemetry signal (e.g., x1(t)) from a first transducer (e.g., transducer 138) responsive to pressure variations in drilling fluid within a drill string. The method 600 continues in block 604 with receiving a second telemetry signal (e.g., x2(t)) from a second transducer (e.g., transducer 140) responsive to the pressure variations. As described above, a downhole device, such as BHA 202 including a pulser, is configured to generate modulated pressure pulses in the drilling fluid, such as to encode information in the modulated pressure pulses.

The method 600 continues further in block 606 with transforming the first and second telemetry signals to a time-frequency domain representation to provide first and second time-frequency telemetry signals, respectively. As described above, a STFT can be applied to x1(t) and x2(t) to provide X1(k, t) and X2(k, t), respectively. In this example, k and t are indices for frequency bins and time bins, respectively.

The method 600 continues in block 608 with applying an unmixing filter to the first and second time-frequency telemetry signals to provide an enhanced signal in the time-frequency domain. For example, a trained neural network can be used to apply the unmixing filter or matrix to the time-frequency telemetry signals X(0, t) through X(K-1, t). The trained neural network applies a corresponding unmixing matrix G(k, t) to each of the time-frequency telemetry signals X(0, t) through X(K-1, t). The unmixing matrix G(k, t) includes K frequency-domain filters, with each of the frequency-domain filters corresponding to one of the K frequency bin components of the time-frequency telemetry signals. The application of the unmixing matrix to the time-frequency telemetry signals provides an enhanced signal in the time-frequency domain, which includes a source signal component separated from a noise component. For example, a first unmixing matrix G(0, t) is applied to (e.g., multiplied with) the first time-frequency telemetry signal X(0, t) to provide Ŝ(0, t), while an Kth unmixing matrix G(K-1, t) is applied to (e.g., multiplied with) the Kth time-frequency telemetry signal X(K-1, t) to provide Ŝ(K-1, t). Accordingly, the output(s) of the trained neural network are Ŝ(0, t) through Ŝ(K-1, t). The separated source signal component (e.g., Ŝ(k, t)) of the enhanced signal represents or corresponds to the modulated pressure pulses generated by the downhole device. Accordingly, the separated source component of the enhanced signal can then be transformed back to the time domain, and processed further (e.g., by the telemetry computer 144) without the presence and/or interference of the noise component.

ADDITIONAL DISCLOSURE

The following are non-limiting, specific embodiments in accordance with the present disclosure:

A first embodiment, which is a telemetry system, comprising: a downhole device configured to generate modulated pressure pulses in drilling fluid within a drill string, wherein information is encoded in the pressure pulses; a first transducer configured provide a first telemetry signal responsive to pressure variations in the drilling fluid; a second transducer configured to provide a second telemetry signal responsive to pressure variations in the drilling fluid; and a telemetry computer coupled to the first and second transducers, the telemetry computer comprising: a processor; and a memory coupled to the processor, the memory containing instructions that, when executed by the processor, cause the telemetry computer to be configured to: transform the first and second telemetry signals to a time-frequency domain representation to provide first and second time-frequency telemetry signals, respectively; and apply an unmixing filter to the first and second time-frequency telemetry signals to provide an enhanced signal in the time-frequency domain, wherein the enhanced signal comprises a source signal component separated from a noise component, and wherein the first and second telemetry signals comprise mixed source-noise signals.

A second embodiment, which is the telemetry system of the first embodiment, wherein the separated source signal component of the enhanced signal corresponds to the modulated pressure pulses generated by the downhole device.

A third embodiment, which is the telemetry system of the first embodiment, wherein each of the first and second time-frequency telemetry signals comprises K frequency bin components, wherein the unmixing filter comprises K frequency-domain filters, each corresponding to one of the K frequency bin components, and wherein the instructions, when executed by the processor, cause the telemetry computer to be further configured to: apply a first frequency-domain filter to first frequency bin components of the first and second time-frequency telemetry signals to provide a first frequency bin component of the enhanced signal; and apply a Kth frequency-domain filter to Kth frequency bin components of the first and second time-frequency telemetry signals to provide a Kth frequency bin component of the enhanced signal.

A fourth embodiment, which is the telemetry system of the third embodiment, wherein the instructions, when executed by the processor, cause the telemetry computer to be further configured to transform the K frequency bin components of the enhanced signal to a time domain representation.

A fifth embodiment, which is the telemetry system of the first embodiment, wherein the instructions, when executed by the processor, cause the telemetry computer to be further configured to apply a short-time Fourier transform to transform the first and second telemetry signals to the time-frequency domain representation.

A sixth embodiment, which is the telemetry system of the first embodiment, wherein filter values of the unmixing filter are determined during a first time period, in which: the downhole device does not generate modulated pressure pulses; the first transducer is configured provide a first noise signal responsive to pressure variations in the drilling fluid; the second transducer is configured to provide a second noise signal responsive to pressure variations in the drilling fluid; and the instructions, when executed by the processor, cause the telemetry computer to be further configured to: transform the first and second noise signals to a time-frequency domain representation to provide first and second time-frequency noise signals, respectively; transform a synthetic telemetry signal to a time-frequency domain representation to provide a time-frequency synthetic telemetry signal; add the time-frequency noise signals and the time-frequency synthetic telemetry signal to provide a mixed signal; and estimate the filter values by training a neural network with the mixed signal.

A seventh embodiment, which is the telemetry system of the sixth embodiment, wherein the time-frequency noise signals and the time-frequency synthetic telemetry signal each comprises K frequency bin components, and wherein the instructions, when executed by the processor, cause the telemetry computer to be further configured to: mix a first frequency bin component of the time-frequency noise signals with a first frequency bin component of the time-frequency synthetic telemetry signal to provide a first frequency bin component of the mixed signal; and mix a Kth frequency bin component of the time-frequency noise signals with a Kth frequency bin component of the time-frequency synthetic telemetry signal to provide a Kth frequency bin component of the mixed signal; wherein a first frequency-domain filter of the unmixing filter is estimated by providing the first frequency bin component of the mixed signal to the neural network; and wherein a Kth frequency-domain filter of the unmixing filter is estimated by providing the Kth frequency bin component of the mixed signal to the neural network.

An eighth embodiment, which is the telemetry system of the sixth embodiment, wherein the memory is configured to store the synthetic telemetry signal.

A ninth embodiment, which is a telemetry method, comprising: receiving a first telemetry signal from a first transducer responsive to pressure variations in drilling fluid within a drill string, wherein a downhole device is configured to generate modulated pressure pulses in the drilling fluid, wherein information is encoded in the pressure pulses; receiving a second telemetry signal from a second transducer responsive to the pressure variations; transforming the first and second telemetry signals to a time-frequency domain representation to provide first and second time-frequency telemetry signals, respectively; and applying an unmixing filter to the first and second time-frequency telemetry signals to provide an enhanced signal in the time-frequency domain, wherein the enhanced signal comprises a source signal component separated from a noise component, and wherein the first and second telemetry signals comprise mixed source-noise signals.

A tenth embodiment, which is the telemetry method of the ninth embodiment, wherein the separated source signal component of the enhanced signal corresponds to the modulated pressure pulses generated by the downhole device.

An eleventh embodiment, which is the telemetry method of the ninth embodiment, wherein each of the first and second time-frequency telemetry signals comprises K frequency bin components, wherein the unmixing filter comprises K frequency-domain filters, each corresponding to one of the K frequency bin components, the method further comprising: applying a first frequency-domain filter to first frequency bin components of the first and second time-frequency telemetry signals to provide a first frequency bin component of the enhanced signal; and applying a Kth frequency-domain filter to Kth frequency bin components of the first and second time-frequency telemetry signals to provide a Kth frequency bin component of the enhanced signal.

A twelfth embodiment, which is the telemetry method of the eleventh embodiment, further comprising transforming the K frequency bin components of the enhanced signal to a time domain representation.

A thirteenth embodiment, which is the telemetry method of the ninth embodiment, further comprising applying a short-time Fourier transform to transform the first and second telemetry signals to the time-frequency domain representation.

A fourteenth embodiment, which is the telemetry method of the ninth embodiment, further comprising determining filter values of the unmixing filter during a first time period, in which: the downhole device does not generate modulated pressure pulses; the first transducer is configured provide a first noise signal responsive to pressure variations in the drilling fluid; and the second transducer is configured to provide a second noise signal responsive to pressure variations in the drilling fluid; wherein the method further comprises: transforming the first and second noise signals to a time-frequency domain representation to provide first and second time-frequency noise signals, respectively; transforming a synthetic telemetry signal to a time-frequency domain representation to provide a time-frequency synthetic telemetry signal; add the time-frequency noise signals and the time-frequency synthetic telemetry signal to provide a mixed signal; and estimating the filter values by training a neural network with the mixed signal.

A fifteenth embodiment, which if the telemetry method of the fourteenth embodiment, wherein the time-frequency noise signals and the time-frequency synthetic telemetry signal each comprises K frequency bin components, the method further comprising: mixing a first frequency bin component of the time-frequency noise signals with a first frequency bin component of the time-frequency synthetic telemetry signal to provide a first frequency bin component of the mixed signal; and mixing a Kth frequency bin component of the time-frequency noise signals with a Kth frequency bin component of the time-frequency synthetic telemetry signal to provide a Kth frequency bin component of the mixed signal; wherein a first frequency-domain filter of the unmixing filter is estimated by providing the first frequency bin component of the mixed signal to the neural network; and wherein a Kth frequency-domain filter of the unmixing filter is estimated by providing the Kth frequency bin component of the mixed signal to the neural network.

A sixteenth embodiment which is a non-transitory, computer-readable medium containing instructions that, when executed by a processor, cause the processor to be configured to: receive a first telemetry signal from a first transducer responsive to pressure variations in drilling fluid within a drill string, wherein a downhole device is configured to generate modulated pressure pulses in the drilling fluid, wherein information is encoded in the pressure pulses; receive a second telemetry signal from a second transducer responsive to the pressure variations; transform the first and second telemetry signals to a time-frequency domain representation to provide first and second time-frequency telemetry signals, respectively; and apply an unmixing filter to the first and second time-frequency telemetry signals to provide an enhanced signal in the time-frequency domain, wherein the enhanced signal comprises a source signal component separated from a noise component, and wherein the first and second telemetry signals comprise mixed source-noise signals.

A seventeenth embodiment, which is the non-transitory, computer-readable medium of the sixteenth embodiment, wherein the separated source signal component of the enhanced signal corresponds to the modulated pressure pulses generated by the downhole device.

An eighteenth embodiment, which is the non-transitory, computer-readable medium of the sixteenth embodiment, wherein each of the first and second time-frequency telemetry signals comprises K frequency bin components, wherein the unmixing filter comprises K frequency-domain filters, each corresponding to one of the K frequency bin components, and wherein the instructions, when executed by the processor, further cause the processor to: apply a first frequency-domain filter to first frequency bin components of the first and second time-frequency telemetry signals to provide a first frequency bin component of the enhanced signal; and apply a Kth frequency-domain filter to Kth frequency bin components of the first and second time-frequency telemetry signals to provide a Kth frequency bin component of the enhanced signal.

A nineteenth embodiment, which is the non-transitory, computer-readable medium of the eighteenth embodiment, wherein the instructions, when executed by the processor, further cause the processor to transform the K frequency bin components of the enhanced signal to a time domain representation.

A twentieth embodiment, which is the non-transitory, computer-readable medium of the sixteenth embodiment, wherein the instructions, when executed by the processor, further cause the processor to determine filter values of the unmixing filter during a first time period, in which: the downhole device does not generate modulated pressure pulses; the first transducer is configured provide a first noise signal responsive to pressure variations in the drilling fluid; and the second transducer is configured to provide a second noise signal responsive to pressure variations in the drilling fluid; wherein the instructions, when executed by the processor, further cause the processor to: transform the first and second noise signals to a time-frequency domain representation to provide first and second time-frequency noise signals, respectively; transform a synthetic telemetry signal to a time-frequency domain representation to provide a time-frequency synthetic telemetry signal; add the time-frequency noise signals and the time-frequency synthetic telemetry signal to provide a mixed signal; and estimate the filter values by training a neural network with the mixed signal.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Use of the term "optionally" with respect to any element of a claim is intended to mean that the subject element may be present in some embodiments and not present in other embodiments. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of this disclosure. Thus, the claims are a further description and are an addition to the embodiments of this disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A telemetry system, comprising:
   a downhole device configured to generate modulated pressure pulses in drilling fluid within a drill string, wherein information is encoded in the pressure pulses;
   a first transducer configured provide a first telemetry signal responsive to pressure variations in the drilling fluid, wherein the first telemetry signal is a signal in a time domain;
   a second transducer configured to provide a second telemetry signal responsive to pressure variations in the drilling fluid, wherein the second telemetry signal is a signal in the time domain; and
   a telemetry computer coupled to the first and second transducers, the telemetry computer comprising:
      a processor; and
      a memory coupled to the processor, the memory containing instructions that, when executed by the processor, cause the telemetry computer to be configured to:
         transform the first and second telemetry signals to a time-frequency domain representation to provide first and second time-frequency telemetry signals, respectively; and
         apply an unmixing filter to the first and second time-frequency telemetry signals to provide an enhanced signal in a time-frequency domain,
         wherein the enhanced signal comprises a source signal component and a noise component, wherein the source signal component is provided as a separated signal from the noise component, and
         wherein the first and second telemetry signals comprise mixed source-noise signals,
   wherein filter values of the unmixing filter are determined during a first time period, in which the downhole device does not generate modulated pressure pulses, the first transducer is configured provide a first noise signal responsive to pressure variations in the drilling fluid, and the second transducer is configured to provide a second noise signal responsive to pressure variations in the drilling fluid, and
   wherein the instructions, when executed by the processor, cause the telemetry computer to be further configured to:
      transform the first and second noise signals to a time-frequency domain representation to provide first and second time-frequency noise signals, respectively;
      transform a synthetic telemetry signal to a time-frequency domain representation to provide a time-frequency synthetic telemetry signal;
      add the time-frequency noise signals and the time-frequency synthetic telemetry signal to provide a mixed signal; and
      estimate the filter values by training a neural network with the mixed signal.

2. The telemetry system of claim 1, wherein the separated source signal component of the enhanced signal corresponds to the modulated pressure pulses generated by the downhole device.

3. The telemetry system of claim 1, wherein each of the first and second time-frequency telemetry signals comprises K frequency bin components, wherein the unmixing filter comprises K frequency-domain filters, each corresponding to one of the K frequency bin components, and wherein the instructions, when executed by the processor, cause the telemetry computer to be further configured to:
   apply a first frequency-domain filter to first frequency bin components of the first and second time-frequency telemetry signals to provide a first frequency bin component of the enhanced signal; and
   apply a Kth frequency-domain filter to Kth frequency bin components of the first and second time-frequency telemetry signals to provide a Kth frequency bin component of the enhanced signal.

4. The telemetry system of claim 3, wherein the instructions, when executed by the processor, cause the telemetry computer to be further configured to transform all the frequency bin components of the enhanced signal to a time domain representation.

5. The telemetry system of claim 1, wherein the instructions, when executed by the processor, cause the telemetry computer to be further configured to apply a short-time Fourier transform to transform the first and second telemetry signals to the time-frequency domain representation.

6. The telemetry system of claim 1, wherein the time-frequency noise signals and the time-frequency synthetic telemetry signal each comprises K frequency bin components, and wherein the instructions, when executed by the processor, cause the telemetry computer to be further configured to:
   mix a first frequency bin component of the time-frequency noise signals with a first frequency bin component of the time-frequency synthetic telemetry signal to provide a first frequency bin component of the mixed signal; and
   mix a Kth frequency bin component of the time-frequency noise signals with a Kth frequency bin component of the time-frequency synthetic telemetry signal to provide a Kth frequency bin component of the mixed signal;
   wherein a first frequency-domain filter of the unmixing filter is estimated by providing the first frequency bin component of the mixed signal to the neural network; and
   wherein a Kth frequency-domain filter of the unmixing filter is estimated by providing the Kth frequency bin component of the mixed signal to the neural network.

7. The telemetry system of claim 1, wherein the memory is configured to store the synthetic telemetry signal.

8. A telemetry method, comprising:
   receiving a first telemetry signal from a first transducer responsive to pressure variations in drilling fluid within a drill string, wherein the first telemetry signal is a signal in a time domain, wherein a downhole device is configured to generate modulated pressure pulses in the drilling fluid, wherein information is encoded in the pressure pulses;
   receiving a second telemetry signal from a second transducer responsive to the pressure variations, wherein the second telemetry signal is a signal in the time domain;
   transforming the first and second telemetry signals to a time-frequency domain representation to provide first and second time-frequency telemetry signals, respectively; and
   applying an unmixing filter to the first and second time-frequency telemetry signals to provide an enhanced signal in a time-frequency domain,
   wherein the enhanced signal comprises a source signal component and a noise component, wherein the source signal component is provided as a separated signal from the noise component,
   wherein the first and second telemetry signals comprise mixed source-noise signals, and
   wherein the method further comprises:
      determining filter values of the unmixing filter during a first time period, in which the downhole device does not generate modulated pressure pulses, the first transducer is configured provide a first noise signal responsive to pressure variations in the drilling fluid, the second transducer is configured to provide a second noise signal responsive to pressure variations in the drilling fluid;
      transforming the first and second noise signals to a time-frequency domain representation to provide first and second time-frequency noise signals, respectively;
      transforming a synthetic telemetry signal to a time-frequency domain representation to provide a time-frequency synthetic telemetry signal;
      adding the time-frequency noise signals and the time-frequency synthetic telemetry signal to provide a mixed signal; and
      estimating the filter values by training a neural network with the mixed signal.

9. The telemetry method of claim 8, wherein the separated source signal component of the enhanced signal corresponds to the modulated pressure pulses generated by the downhole device.

10. The telemetry method of claim 8, wherein each of the first and second time-frequency telemetry signals comprises K frequency bin components, wherein the unmixing filter comprises K frequency-domain filters, each corresponding to one of the K frequency bin components, the method further comprising:
    applying a first frequency-domain filter to first frequency bin components of the first and second time-frequency telemetry signals to provide a first frequency bin component of the enhanced signal; and
    applying a Kth frequency-domain filter to Kth frequency bin components of the first and second time-frequency telemetry signals to provide a Kth frequency bin component of the enhanced signal.

11. The telemetry method of claim 10, further comprising transforming all the frequency bin components of the enhanced signal to a time domain representation.

12. The telemetry method of claim 8, further comprising applying a short-time Fourier transform to transform the first and second telemetry signals to the time-frequency domain representation.

13. The telemetry method of claim 8, wherein the time-frequency noise signals and the time-frequency synthetic telemetry signal each comprises K frequency bin components, the method further comprising:
    mixing a first frequency bin component of the time-frequency noise signals with a first frequency bin component of the time-frequency synthetic telemetry signal to provide a first frequency bin component of the mixed signal; and
    mixing a Kth frequency bin component of the time-frequency noise signals with a Kth frequency bin component of the time-frequency synthetic telemetry signal to provide a Kth frequency bin component of the mixed signal;
    wherein a first frequency-domain filter of the unmixing filter is estimated by providing the first frequency bin component of the mixed signal to the neural network; and
    wherein a Kth frequency-domain filter of the unmixing filter is estimated by providing the Kth frequency bin component of the mixed signal to the neural network.

14. A non-transitory, computer-readable medium containing instructions that, when executed by a processor, cause the processor to be configured to:
    receive a first telemetry signal from a first transducer responsive to pressure variations in drilling fluid within a drill string, wherein the first telemetry signal is a signal in a time domain, wherein a downhole device is configured to generate modulated pressure pulses in the drilling fluid, wherein information is encoded in the pressure pulses;

receive a second telemetry signal from a second transducer responsive to the pressure variations, wherein the second telemetry signal is a signal in the time domain;

transform the first and second telemetry signals to a time-frequency domain representation to provide first and second time-frequency telemetry signals, respectively; and apply an unmixing filter to the first and second time-frequency telemetry signals to provide an enhanced signal in a time-frequency domain, wherein the enhanced signal comprises a source signal component and a noise component, wherein the source signal component is provided as a separated signal from the noise component, wherein the first and second telemetry signals comprise mixed source-noise signals, and wherein the instructions, when executed by the processor, further cause the processor to:

determine filter values of the unmixing filter during a first time period, in which the downhole device does not generate modulated pressure pulses, the first transducer is configured provide a first noise signal responsive to pressure variations in the drilling fluid, and the second transducer is configured to provide a second noise signal responsive to pressure variations in the drilling fluid;

transform the first and second noise signals to a time-frequency domain representation to provide first and second time-frequency noise signals, respectively;

transform a synthetic telemetry signal to a time-frequency domain representation to provide a time-frequency synthetic telemetry signal;

add the time-frequency noise signals and the time-frequency synthetic telemetry signal to provide a mixed signal; and estimate the filter values by training a neural network with the mixed signal.

15. The non-transitory, computer-readable medium of claim 14, wherein the separated source signal component of the enhanced signal corresponds to the modulated pressure pulses generated by the downhole device.

16. The non-transitory, computer-readable medium of claim 14, wherein each of the first and second time-frequency telemetry signals comprises K frequency bin components, wherein the unmixing filter comprises K frequency-domain filters, each corresponding to one of the K frequency bin components, and wherein the instructions, when executed by the processor, further cause the processor to:

apply a first frequency-domain filter to first frequency bin components of the first and second time-frequency telemetry signals to provide a first frequency bin component of the enhanced signal; and apply a Kth frequency-domain filter to Kth frequency bin components of the first and second time-frequency telemetry signals to provide a Kth frequency bin component of the enhanced signal.

17. The non-transitory, computer-readable medium of claim 16, wherein the instructions, when executed by the processor, further cause the processor to transform all the frequency bin components of the enhanced signal to a time domain representation.

18. The non-transitory, computer-readable medium of claim 14, wherein the time-frequency noise signals and the time-frequency synthetic telemetry signal each comprises K frequency bin components, and wherein the instructions, when executed by the processor, cause the processor to:

mix a first frequency bin component of the time-frequency noise signals with a first frequency bin component of the time-frequency synthetic telemetry signal to provide a first frequency bin component of the mixed signal; and mix a Kth frequency bin component of the time-frequency noise signals with a Kth frequency bin component of the time-frequency synthetic telemetry signal to provide a Kth frequency bin component of the mixed signal;

wherein a first frequency-domain filter of the unmixing filter is estimated by providing the first frequency bin component of the mixed signal to the neural network; and wherein a Kth frequency-domain filter of the unmixing filter is estimated by providing the Kth frequency bin component of the mixed signal to the neural network.

\* \* \* \* \*